(12) United States Patent
Siolek-Komorek et al.

(10) Patent No.: US 12,110,303 B2
(45) Date of Patent: Oct. 8, 2024

(54) MIXTURES OF AMINOSILYL-FUNCTIONALIZED STYRENES, THEIR PREPARATION AND THEIR USE IN THE PRODUCTION OF ELASTOMERIC COPOLYMERS

(71) Applicants: SYNTHOS S.A., Oswiecim (PL); SYNTHOS DWORY 7 SPOLKA Z OGRANICZONA ODPOWIEDZIALNOSCIA SPOLKA JAWNA, Oswiecim (PL)

(72) Inventors: Maria Siolek-Komorek, Katowice (PL); Tomasz Skrok, Warsaw (PL); Jaroslaw Rogoza, Kryspinow (PL); Radoslaw Kozak, Chorzow (PL); Pawel Weda, Knurow (PL); Malgorzata Pierog, Szczecin (PL)

(73) Assignees: SYNTHOS S.A., Oswiecim (PL); SYNTHOS DWORY 7 SPOLKA Z OGRANICZONA ODPOWIEDZIALNOSCIA SPOLKA JAWNA, Oswiecim (PL)

( * ) Notice: Subject to any disclaimer, the term of this patent is extended or adjusted under 35 U.S.C. 154(b) by 641 days.

(21) Appl. No.: 17/046,115

(22) PCT Filed: Apr. 10, 2019

(86) PCT No.: PCT/EP2019/059062
§ 371 (c)(1),
(2) Date: Oct. 8, 2020

(87) PCT Pub. No.: WO2019/197455
PCT Pub. Date: Oct. 17, 2019

(65) Prior Publication Data
US 2021/0061826 A1 Mar. 4, 2021

(30) Foreign Application Priority Data

Apr. 11, 2018 (EP) .................................. 18461548

(51) Int. Cl.
| | |
|---|---|
| C07F 7/10 | (2006.01) |
| B60C 1/00 | (2006.01) |
| B60C 11/00 | (2006.01) |
| C08F 212/14 | (2006.01) |
| C08F 236/06 | (2006.01) |
| C08F 236/10 | (2006.01) |
| C08L 9/06 | (2006.01) |

(52) U.S. Cl.
CPC .............. *C07F 7/10* (2013.01); *B60C 1/0016* (2013.01); *B60C 11/0008* (2013.01); *C08F 236/10* (2013.01); *C08L 9/06* (2013.01); *B60C 1/00* (2013.01); *B60C 2011/0025* (2013.01); *C08F 212/14* (2013.01); *C08F 212/26* (2020.02); *C08F 212/28* (2020.02); *C08F 236/06* (2013.01)

(58) Field of Classification Search
CPC ........ C07F 7/10; C08F 236/06; C08F 236/10; C08F 212/14; C08F 212/26; C08F 212/28; B60C 1/00–0016
See application file for complete search history.

(56) References Cited

U.S. PATENT DOCUMENTS

| | | | |
|---|---|---|---|
| 3,109,871 A | 11/1963 | Zelinski et al. | |
| 4,196,154 A | 4/1980 | Tung et al. | |
| 4,861,742 A | 8/1989 | Bronstert et al. | |
| 4,894,409 A | 1/1990 | Shimada et al. | |
| 4,935,471 A | 6/1990 | Halasa et al. | |
| 6,515,087 B2 | 2/2003 | Hsu et al. | |
| 6,627,722 B2 | 9/2003 | Rodewald et al. | |
| 2002/0099148 A1* | 7/2002 | Hsu ........................ | C08C 19/44 |
| | | | 525/331.9 |
| 2018/0065996 A1 | 3/2018 | Maciejewski et al. | |

FOREIGN PATENT DOCUMENTS

| | | | | |
|---|---|---|---|---|
| EP | 0 316 255 | | 5/1989 | |
| EP | 0 590 491 | | 4/1994 | |
| EP | 0 867 439 | | 9/1998 | |
| EP | 1481996 | A1 * | 12/2004 | ............ C08F 297/04 |
| EP | 1 792 892 | | 6/2007 | |
| EP | 2 772 515 | | 9/2014 | |
| EP | 2 821 418 | | 1/2015 | |
| EP | 3 159 346 | | 4/2017 | |
| JP | 2011-074310 | | 4/2011 | |
| JP | 2012-167207 | | 9/2012 | |
| JP | 2013-159770 | A | 8/2013 | |
| JP | 2013-163761 | | 8/2013 | |
| JP | 2013-249418 | | 12/2013 | |
| RU | 2485136 | C2 | 6/2013 | |
| WO | 2008156788 | A2 | 12/2008 | |
| WO | 2011/076377 | | 6/2011 | |

(Continued)

OTHER PUBLICATIONS

Machine translation of JP-2012167207-A (included in IDS dated Oct. 8, 2020) from PatentScope. (Year: 2012).*

(Continued)

*Primary Examiner* — Hannah J Pak
*Assistant Examiner* — David R. Foss
(74) *Attorney, Agent, or Firm* — NIXON & VANDERHYE, PC

(57) ABSTRACT

The present invention relates to mixtures of specific styrene derivatives and their use in the production of an elastomeric copolymer. The styrene derivatives are of the following formula.

34 Claims, No Drawings

(56) References Cited

FOREIGN PATENT DOCUMENTS

| WO | 2016/162482 | 10/2016 |
| WO | 2016/162528 | 10/2016 |
| WO | 2018/065486 | 4/2018 |
| WO | 2018/065494 | 4/2018 |

OTHER PUBLICATIONS

Search Report and English Translation issued for Russian Application No. 2020135401, date of completion of search Mar. 25, 2022, 4 pages.
Official Action and English Translation issued for Russian Application No. 2020135401, dated Mar. 25, 2022, 11 pages.
XuMuk, Prime Chemicals Group On line handbook, https://xumuk.ru/organika/36.html, 4 pages.
Taki et al., "Polymerization of Monomers Containing Functional Silyl Groups. 9. Anionic Living Polymerization of (4-Vinylphenyl)(N,N-diethylamino)dimethylsilane" *Macromolecules*, vol. 24: 1455-1458 (1991).
International Search Report for PCT/EP2019/059062 mailed Jul. 25, 2019, 5 pages.
Written Opinion of the ISA for PCT/EP2019/059062 mailed Jul. 25, 2019, 5 pages.

\* cited by examiner

MIXTURES OF AMINOSILYL-FUNCTIONALIZED STYRENES, THEIR PREPARATION AND THEIR USE IN THE PRODUCTION OF ELASTOMERIC COPOLYMERS

This application is the U.S. national phase of International Application No. PCT/EP2019/059062 filed Apr. 10, 2019 which designated the U.S. and claims priority to EP patent application Ser. No. 18/461,548.2 filed Apr. 11, 2018, the entire contents of each of which are hereby incorporated by reference.

The present invention relates to mixtures of specific styrene derivatives and their use in the production of an elastomeric copolymer. The invention further relates to methods for producing an elastomeric copolymer and an elastomeric copolymer. Moreover, the invention relates to a method for preparing a rubber comprising vulcanizing the elastomeric copolymer, and a rubber as obtainable according to the method. Further, the invention relates to a rubber composition, a tire component comprising the rubber composition, and a tire comprising the tire component.

BACKGROUND OF THE INVENTION

It is important for elastomeric copolymers that are used in tires, hoses, power transmission belts and other industrial products to have a good compatibility with fillers, such as carbon black and silica. To attain improved interaction with fillers, such elastomeric copolymers can be functionalized with various compounds, such as amines. It has also been recognized that carbon black, when employed as reinforcing filler in rubber compounds, should be well dispersed throughout the rubber in order to improve various physical properties.

EP 0 316 255 A2 discloses a process for end-capping polydienes by reacting a metal terminated polydiene with a capping agent such as a halogenated nitrile, a heterocyclic aromatic nitrogen-containing compound or an alkyl benzoate. Additionally, EP 0 316 255 A1 discloses that both ends of the polydiene chains can be capped with polar groups by utilizing functionalized initiators, such as lithium amides.

U.S. Pat. No. 4,894,409 teaches a rubber composition comprising not less than 20% by weight of an amino group-containing diene based polymer in a rubber component, and 10 to 100 parts by weight of silica as a filler with respect to 100 parts by weight of the rubber component.

U.S. Pat. No. 4,935,471 A discloses methods of synthesizing living anionic polymerization initiators based on aromatic N-heterocyclic compounds such as pyrrole, imidazole, pyrazole, pyrazinyl, pyrimidine, pyridazinyl and phenanthroline derivatives and their use in the production of N-functionalized polybutadienes. A similar approach is disclosed in U.S. Pat. No. 6,515,087 B2, EP 0 590 491 A1 and WO 2011/076 377 A1 where acyclic and cyclic amines are used in the preparation of the active anionic polymerization initiators and are utilized in a further step in the synthesis of di-N-functionalized butadiene-styrene copolymers.

EP 3 159 346 A1 relates to aminosilane-functionalized diene compounds, as modifying monomers in the polymerization of conjugated diene monomers.

The synthesis of di-N-functionalized butadiene-styrene polymers is also disclosed in U.S. Pat. Nos. 4,196,154 A, 4,861,742 A and 3,109,871 A. However, in the processes for their preparation, aminofunctional aryl-methyl ketones are used and also serve as functionalizing terminating agents. The above described N-modification methods only allow the preparation of polydienes in which the polymer chain may contain no more than two moieties with amine functionality.

Another approach to prepare N-functionalized polymers with a different content of N-functional groups would be the incorporation of suitable styrene monomers into the polymer chain, which controlled addition into the reaction system would lead to a wide variety of styrene-butadiene rubbers with a different content of N-functional groups and thus exhibiting different ability to disperse inorganic fillers. EP 1 792 892 A2 discloses a method for the preparation of aminoethyl-functionalized styrene monomers (by the reaction of a variety of acyclic and cyclic lithium amides with 1,3- or 1,4-divinylbenzene, 1,3-di(iso-propylene)benzene or a mixture of isomeric chloromethylvinylbenzenes) that are used in a further step in the preparation of butadiene-styrene copolymer rubbers containing different amounts of aminofunctional groups.

According to U.S. Pat. No. 6,627,722 B2, polymer-containing units of a vinylaromatic ring-substituted with aminoalkyl, aminoalkyloxyalkyl or alkylthioalkyl groups, especially pyrrolidinylmethyl or hexamethylene-iminomethyl groups, can be polymerized into elastomeric copolymers having low hysteresis and good compatibility with fillers, such as carbon black and silica. Improved polymer properties are achieved because the styrene derivatives improve the compatibility of the rubber with the fillers.

EP 2 772 515 A1 teaches a conjugated diene polymer obtained by polymerizing a monomer component including a conjugated diene component and a silicon-containing vinyl compound. The silicon-containing vinyl compound may be a silyl-substituted styrene. However, the compounds according to EP 2 772 515 A1 are hydrolytically unstable under the typical processing conditions, compare the N,N-bis(SiMe$_3$)$_2$ aniline derivatives disclosed in Org. Lett. 2001, 3, 2729.

Therefore, it was the object of the present invention to overcome the disadvantages associated with the prior art and to provide functionalized styrene derivatives whose application in the synthesis of polydienes leads to end-chain and/or in-chain modified polymer compositions that have better affinity to both of the two typical fillers commonly applied in tire production, i.e. silica and carbon black. The functionalized styrene derivatives should also be hydrolytically more stable than those of EP 2 772 515 A1.

This object was achieved by the use of mixtures of two or more aminosilyl-functionalized styrene derivatives of Formula (I). These mixtures are preferably used as comonomers in the production of elastomeric copolymers. Alternatively, or additionally, they are preferably used in the preparation of polymerization initiators.

SUMMARY OF THE INVENTION

Accordingly, the present invention relates to mixtures of specific styrene derivatives that can be polymerized into elastomeric copolymers having good compatibility with fillers, such as silica and/or carbon black. The styrene derivatives of the present invention are typically incorporated into the elastomeric copolymer by being copolymerized with one or more conjugated diolefin monomers and optionally (and preferably) other monomers that are copolymerizable therewith, such as vinyl aromatic monomers. In any case, improved copolymer properties are achieved because the styrene derivatives of the present invention improve the compatibility of the resultant rubber with the types of fillers that are typically used in rubber compounds, namely silica and/or carbon black.

The present invention more specifically relates to monomers that are particularly useful for the copolymerization with conjugated diolefin monomers and optionally vinyl aromatic monomers, to produce elastomeric copolymers having better compatibility with fillers.

Accordingly, and in a first aspect, the invention relates to a mixture of two or more styrene derivatives of Formula (I) below.

According to a second aspect, the invention relates to a process for the preparation of the mixture of two or more styrene derivatives of Formula (I).

In a third aspect, the invention relates to the use of two or more styrene derivatives of Formula (I) in the preparation of a copolymer thereof.

In fourth and fifth aspects, the invention relates to specific processes comprising the use of two or more styrene derivatives of Formula (I).

In a sixth aspect, the invention relates to the copolymer comprising units derived from two or more styrene derivatives of Formula (I).

In a seventh aspect, the invention relates to a method for preparing a rubber.

In an eighth aspect, the invention relates to a rubber obtainable according to the method of the seventh aspect.

In a ninth aspect, the invention relates to a rubber composition comprising the rubber of the eighth aspect.

In a tenth aspect, the invention relates to a tire component comprising the rubber composition as per the ninth aspect.

In an eleventh aspect, the invention relates to a tire comprising the tire component of the tenth aspect.

Preferred embodiments of the aspects of the invention are set out below. The statements as to the preferred embodiments of the first aspect of the invention apply accordingly to the second to eleventh aspects.

In the first aspect, the invention relates to a mixture of two or more styrene derivatives of Formula (I). In the styrene derivative of Formula (I),

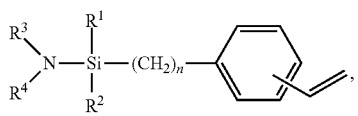
(I)

n is 0 or 1; and $R^1$ and $R^2$ can be the same or different and represent an alkyl group containing from 1 to 10 carbon atoms, or an aryl or aralkyl group containing from 6 to 10 carbon atoms.

In a preferred embodiment, the first aspect further relates to a composition comprising two or more styrene derivatives of Formula (I), with a total amount of styrene derivative of Formula (I) of at least 70 percent by weight, preferably at least 80 percent by weight, most preferably at least 85 percent by weight, in particular at least 90 percent by weight, each based on the weight of the composition.

In one embodiment i), $R^3$ and $R^4$ can be the same or different and each $R^3$ and $R^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or In an alternative embodiment ii), $R^3$ and $R^4$ are bonded to each other to form a heterocyclic ring containing the nitrogen atom and at least one carbon atom and, optionally, at least one heteroatom selected from a silicon atom, an oxygen atom and a nitrogen atom.

Preferably, the two substituents on the aromatic ring are located in meta (i.e. in 1,3) or in para (i.e. in 1,4) position to one another, more preferably in para (1,4) position. Whenever reference is made in the following to isomers, this refers to constitutional isomerism in respect of the styrene's aromatic ring.

Preferably, the styrene derivative is of Formula (Ia), (Ib), or (Ic)

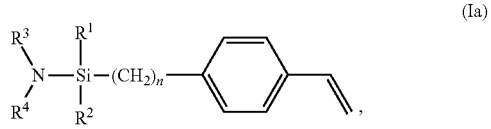
(Ia)

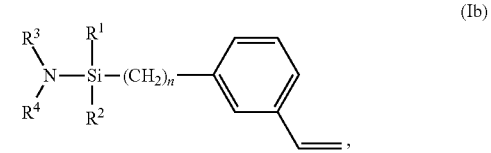
(Ib)

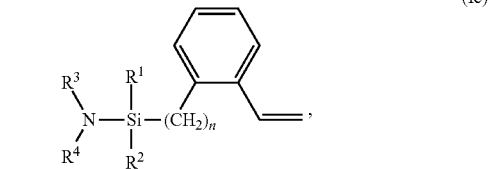
(Ic)

Generally, the invention allows for the combination of styrene derivatives of Formula (I) having n=1, n=0, including all isomers thereof. Due to the different reactivity of these different styrene derivatives of Formula (I), efficient reaction between the functional group and silica filler will be prolonged in time, which will affect the dispersion of silica. Otherwise, too fast a reaction between silica and the functional group might result in worse processability and lower silica dispersion.

However, the mixture is most preferably a mixture of isomers of one type of styrene derivative of Formula (I) and comprises para isomer, of Formula (Ia), and additionally meta (Ib) or ortho (Ia) isomer of this styrene derivative of Formula (I). Again, due to the different reactivity of ortho, meta and para isomers, efficient reaction between the functional group and silica filler will be prolonged in time, which will affect the dispersion of silica. Otherwise, too fast a reaction between silica and the functional group might result in worse processability and lower silica dispersion.

Most preferably, the mixture is of isomers and is a mixture
a. of a styrene derivative of Formula (Ia) with a styrene derivative of Formula (Ib), i.e. is a mixture of para and meta isomers; or
b. of a styrene derivative of Formula (Ia) with a styrene derivative of Formula (Ic), i.e. is a mixture of para and ortho isomers.

Alternatively, the mixture according to the first aspect is
c. of a styrene derivative of Formula (I) having n=1 and a styrene derivative of Formula (I) having n=0.

The mixture according to the invention may comprise more than two styrene derivatives of Formula (I), i.e. three, four, or five styrene derivatives of Formula (I).

As mentioned above, in a most preferred embodiment, the mixture is a mixture of isomers of one type of styrene derivative of Formula (I), preferably wherein the ratio of the isomers is in a range of from 1:99 to 99:1, preferably in a range of from 1:9 to 9:1, more preferably in a range of from 2:8 to 8:2. It is also preferred in the mixture that para isomer constitutes at least 30 percent by weight, more preferably at least 40 percent by weight.

In a preferred composition comprising two or more isomers of a styrene derivative of Formula (I), para isomer constitutes at least 30 percent by weight, more preferably at least 40 percent by weight, per total weight of styrene derivative of Formula (I) in the composition.

In a preferred embodiment, n=1, and the mixture is of isomers. In this embodiment, preferred are (i) a mixture of para and meta isomer, (ii) a mixture of ortho and meta isomer, and (iii) a mixture of ortho and para isomer.

In a further preferred embodiment, n=0, and the mixture is also of isomers. In this embodiment, preferred are also (i) a mixture of para and meta isomer, (ii) a mixture of ortho and meta isomer, and (iii) a mixture of ortho and para isomer.

In another embodiment, the mixture is of four styrene derivatives of Formula (I), namely mixture of ortho and para isomers of a styrene derivative of Formula (I) having n=1, and para and meta isomers of a styrene derivative of Formula (I) having n=0.

In the styrene derivative, $R^1$ and $R^2$ can be the same or different and represent $CH_3$ or $C_6H_5$. Preferably, $R^1$ and $R^2$ both represent $CH_3$.

The styrene derivative of Formula (I) may preferably have i) $R^3$ and $R^4$ independently selected from alkyl and alkoxyalkyl groups. Preferably, $R^3$ and $R^4$ are independently selected from methyl and methoxyethyl groups. In this embodiment, $R^3$ and $R^4$ preferably both represent $CH_3$, more preferably, the styrene derivative is of Formula (1), (2), (3), (4), (5), or (6)

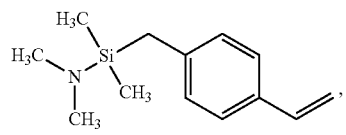

(1)

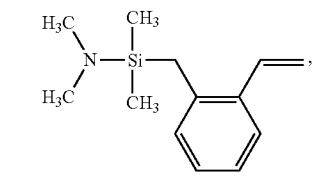

(2)

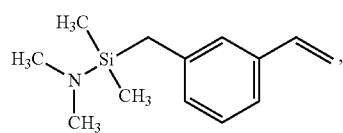

(3)

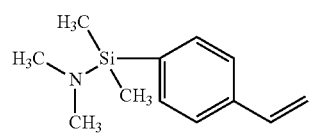

(4)

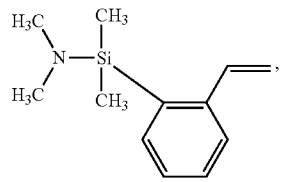

(5)

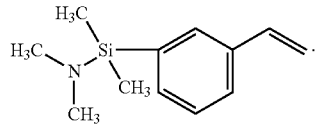

(6)

Preferably, the mixture according to the first aspect is of two or more of the isomers (1), (2), and (3). Also, the mixture according to the first aspect may be of two or more of the isomers (4), (5), and (6).

Alternatively, ii) $R^3$ and $R^4$ in the styrene derivative of Formula (I) are be bonded to each other to form an alpha, omega-alkylene group, preferably a 1,4-butylene or 1,5-pentylene group. In the embodiment having $R^3$ and $R^4$ bonded to each other to form a 1,4-butylene group, the styrene derivative is preferably of Formula (7), (8), (9), or (10)

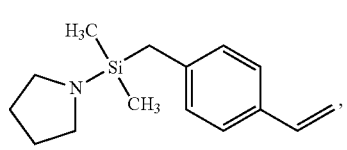

(7)

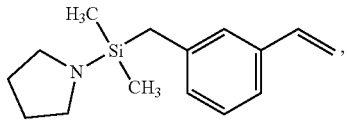

(8)

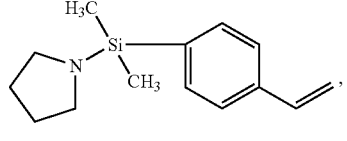

(9)

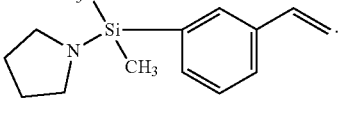

(10)

Preferably, the mixture according to the first aspect is of isomers (7) and (8). Also, the mixture according to the first aspect may be of isomers (9) and (10).

In the second aspect, the method for the preparation of the mixture of two or more styrene derivatives of Formula (I) comprises reacting a halogenosilane of Formula (II)

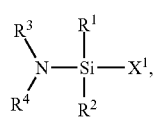

(II)

wherein $X^1$ is selected from chlorine, bromine, and iodine atoms, and $R^1$, $R^2$, $R^3$ and $R^4$ are as defined above, with a mixture of two or more magnesium compounds of Formula (III),

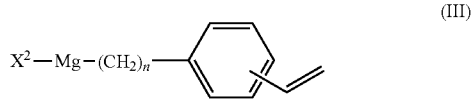

(III)

wherein $X^2$ is selected from chlorine, bromine, and iodine atoms.

Preferably, the reaction is performed in an organic solvent in an inert gas atmosphere. More preferably, the reaction is performed in an aliphatic or cyclic ether solvent (in particular the solvent is tetrahydrofuran, THF).

Styrene derivatives of Formula (I) may be used as comonomeric substrates for obtaining in particular styrene-butadiene rubbers with unique physicochemical properties. Thus, as per the third aspect, the invention relates to the use of the mixture of styrene derivatives of the first aspect in the preparation of a copolymer thereof. Preferably, the copolymer comprises repeat units that are derived from A) 20 wt. % to 99.95 wt. %, by weight of the copolymer, of one or more diene monomers;
B) 0 wt. % to 60 wt. %, by weight of the copolymer, of one or more vinyl aromatic monomers; and
C) 0.05 wt. % to 50 wt. %, by weight of the copolymer, of two or more styrene derivatives of Formula (I).

An alkali metal salt derivative of the mixture of styrene derivatives of Formula (I) is preferably used as initiator for the copolymerization of i) one or more conjugated diene monomers and optionally ii) one or more vinyl aromatic monomers, wherein the alkali metal is selected from lithium, sodium, and potassium. Alternatively, the mixture of styrene derivatives of Formula (I) is used as comonomer. Preferably, the mixture of styrene derivatives of Formula (I) is used as both x) comonomer and as y) alkali metal salt derivative, as initiator for the copolymerization.

According to the fourth aspect, the invention relates to a process for the preparation of a copolymer component comprising coupled copolymer and terminally modified copolymer, the process comprising the following steps:

(1) providing an initiator component comprising two or more styrene derivatives of Formula (I) as alkali metal salt derivative;
(2) contacting a monomer component comprising
 i) one or more conjugated diene monomers and
 ii) optionally one or more vinyl aromatic monomers with the initiator component, to initiate anionic copolymerization;
(3) continuing copolymerization, to result in a copolymer;
(4) optionally continuing copolymerization of the copolymer, in the presence of one or more functionalized monomers, to result in a functionalized copolymer;
(5) coupling a part of the copolymer of step (3) or the functionalized copolymer of step (4) with one or more coupling agents, to result in coupled copolymer; and
(6) terminally modifying a part of the copolymer of step (3) or the functionalized copolymer of step (4) with one or more terminal modifying agents, to result in terminally modified copolymer.

Preferably, the monomer component in step (2) comprises one, two, or more styrene derivatives of Formula (I).

According to the present invention, polymerization and recovery of polymer are suitably carried out according to various methods suitable for diene monomer polymerization processes. This includes batch-wise, semi-continuous, or continuous operations under conditions that exclude air and other atmospheric impurities, particularly oxygen and moisture. Preferably, the polymerization is batch-wise or continuous. The commercially preferred method of polymerization is anionic solution polymerization.

According to a fifth aspect, the invention relates to a process for producing an elastomeric copolymer comprising subjecting
 one or more diene monomers,
 optionally one or more vinyl aromatic monomers and
 two or more styrene derivatives of Formula (I);
 to anionic polymerization conditions.

One of the greatest advantages of the styrene derivative of general Formula (I) is that there is no need for omega-chain end functionalization, with additional compounds, to provide chemical interaction of rubber with the silica filler (even though additional omega-chain end functionalization is not excluded). Furthermore, the best dynamic properties of rubber compounds obtained using rubber functionalized with styrene derivative of Formula (I) are achieved when this monomer is also used as functional pre-initiator. Preferably, the anionic polymerization conditions include initiating the polymerization with an alkali metal salt derivative of the styrene derivative of Formula (I). More preferably, the mixture of styrene derivatives of Formula (I) is used, as alkali metal salt derivative, as initiator.

Polymerization will typically be initiated with an anionic initiator, such as an organic lithium compound, a lithium amide compound, or a functionalized initiator-containing nitrogen atom. As the organic lithium compound, there are preferred those having a hydrocarbon group having 1 to 20 carbon atoms. There can be mentioned, for example, methyl lithium, ethyl lithium, n-propyl lithium, isopropyl lithium, n-butyl lithium, sec-butyl lithium, tert-octyl lithium, n-decyl lithium, phenyllithium, 2-naphthyl lithium, 2-butylphenyl lithium, 4-phenylbutyl lithium, cyclohexyl lithium, cyclopentyl lithium, and a reaction product of diisopropylbenzene with butyl lithium. Of these compounds, n-butyl lithium and sec-butyl lithium are preferred.

As the lithium amide compound, there can be mentioned, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptyl-amide, lithium dihexylamide, lithium dioctylamide, lithium di-2-ethylhexylamide, lithium didecylamide, lithium N-methylpiperadide, lithium ethylpropylamide, lithium ethylbutylamide, lithium ethylbenzylamide and lithium methylphenethylamide. Of these compounds, preferred from the standpoint of the polymerization initiation ability are cyclic lithium amides such as lithium hexamethyleneimide, lithium pyrrolidide, lithium piperidide, lithium heptamethyleneimide and lithium dodecamethyleneimide; and particularly preferred are lithium hexamethyleneimide, lithium pyrrolidide and lithium piperidide.

The lithium amide compound, if present, is, in general, prepared beforehand from a secondary amine and a lithium compound and then used in polymerization; however, it may be prepared in the polymerization system (in situ). The amount of the lithium initiator utilized will vary with the monomers being polymerized and with the molecular weight that is desired for the polymer being synthesized.

In batch operations, the polymerization time of functionalized monomers can be varied as desired. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

The temperature in the polymerization reaction is preferably in a range of from −20 to 150° C., more preferably from 0 to 120° C. The polymerization reaction can be conducted under the pressure which appears in the reaction, but is preferably conducted at a pressure which is sufficient to keep the monomer substantially in a liquid phase. That is, the polymerization pressure used differs depending upon the individual substances to be polymerized, the polymerization medium used, and the polymerization temperature employed; however, a higher pressure may be used if necessary, and such a pressure can be obtained by an appropriate means such as pressurization of reactor using a gas inert to the polymerization reaction.

The styrene derivatives of Formula (I) can be incorporated into virtually any type of elastomeric copolymer that is capable of being made by solution polymerization with an anionic initiator. The polymerization employed in synthesizing the elastomeric copolymers will normally be carried out in a hydrocarbon solvent. The solvents used in such solution polymerizations will normally contain from 4 to 10 carbon atoms per molecule and will be liquids under the conditions of the polymerization. Some representative examples of suitable organic solvents include pentane, isooctane, cyclohexane, n-hexane, benzene, toluene, xylene, ethylbenzene, tetrahydrofuran, and the like, alone or in admixture.

In solution polymerization, there will normally be a total of from 5 to 30 wt. % monomers in the polymerization medium. Such polymerization media are typically comprised of the organic solvent and monomers. In most cases, it will be preferred for the polymerization medium to contain from 10 to 25 wt. % monomers. It is generally more preferred for the polymerization medium to contain 10 to 20 wt. % monomers.

According to the sixth aspect, the invention relates to an elastomeric copolymer comprising repeat units that are derived from
A) 20 wt. % to 99.95 wt. %, by weight of the copolymer, of one or more diene monomers;
B) 0 wt. % to 60 wt. %, by weight of the copolymer, of one or more vinyl aromatic monomers; and
C) 0.05 wt. % to 50 wt. %, by weight of the copolymer, of two or more styrene derivatives of Formula (I).

The elastomeric copolymers produced by the process of this invention can be made by random copolymerization of the styrene derivatives of Formula (I) with (either conjugated or non-conjugated) diolefins (dienes). Conjugated diolefin monomers containing from 4 to 8 carbon atoms are generally preferred. Preferably, the diene monomer is a conjugated diene monomer. More preferably, the conjugated diene monomer is selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene, most preferably, the conjugated diene monomer is selected from 1,3-butadiene and isoprene, in particular, the conjugated diene monomer is 1,3-butadiene.

The amount of A) conjugated diene monomer in the elastomeric copolymer is preferably 40 to 90 wt. %, by weight of the copolymer, more preferably 50 to 90 wt. %, by weight of the copolymer, in particular 60 to 90 wt. %, by weight of the copolymer.

The vinyl aromatic monomer in the elastomeric copolymer is preferably selected from styrene, 1-vinylnaphthalene, 3-methylstyrene, 3,5-diethylstyrene, 4-propylstyrene, 2,4,6-trimethylstyrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, and α-methylstyrene. More preferably, the vinyl aromatic monomer is selected from styrene, 3-methylstyrene and α-methylstyrene (in particular, the vinyl aromatic monomer is styrene).

The amount of B) vinyl aromatic monomer in the elastomeric copolymer is preferably 10 to 60 wt. %, by weight of the copolymer, more preferably 10 to 50 wt. %, by weight of the copolymer, in particular 20 to 50 wt. %, by weight of the copolymer.

The amount of C) styrene derivative of Formula (I) in the elastomeric copolymer is preferably 0.05 to 50 wt. %, by weight of the copolymer, more preferably 0.2 to 10 wt. %, by weight of the copolymer. Good results can normally already be obtained by including 0.3% to 5% (by weight of monomers) of styrene derivative of Formula (I) in the elastomeric copolymer. It is typically preferred to incorporate 0.5% to 2% (by weight of monomers) of the functionalized monomer of Formula (I) into the elastomeric copolymer.

Some representative examples of elastomeric copolymers that can be functionalized by using the styrene derivatives of this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methyl-styrene-isoprene-butadiene rubber and α-methylstyrene-styrene-isoprene-butadiene rubber. In cases where the elastomeric copolymer is comprised of repeat units that are derived from two or more monomers, the repeat units which are derived from the different monomers, including the styrene derivative, will normally be distributed in an essentially random manner. The repeat units that are derived from the monomers differ from the monomer in that a double bond is normally consumed in by the polymerization reaction.

The elastomeric copolymer can be made by solution polymerization in a batch process or in a continuous process by continuously charging at least one conjugated diolefin monomer, the styrene derivative, and any optional additional monomers into a polymerization zone. The polymerization zone will typically be a polymerization reactor or a series of polymerization reactors. The polymerization zone will normally provide agitation to keep the monomers, polymer, initiator, and modifier well dispersed throughout the organic solvent in the polymerization zone. Such continuous polymerizations are typically conducted in a multiple-reactor system. The elastomeric copolymer as synthesized is continuously withdrawn from the polymerization zone. Incremental addition, or a chain transfer agent, such as 1,2-butadiene, may be used in order to avoid excessive gel formation. The monomer conversion attained in the polymerization zone will normally be at least about 85%. It is preferred for the monomer conversion to be at least about 90%.

The polymerization process of this invention is normally conducted in the presence of polar modifiers, such as tertiary amines, alcoholates or alkyltetrahydrofurfuryl ethers. Some representative examples of specific polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, 2,2-Bis(2-tetrahydrofuryl)propane, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethyl-ethylenediamine, N-methylmorpholine, N-ethylmorpholine, and N-phenylmorpholine.

A potassium or sodium compound may be added together with the polymerization initiator when it is intended to increase the reactivity of the polymerization initiator or when it is intended to arrange the aromatic vinyl compound at random in the polymer obtained or to allow the obtained polymer to contain the aromatic vinyl compound as a single chain. As the potassium or sodium added together with the polymerization initiator, there can be used, for example: alkoxides and phenoxides, typified by isopropoxide, tert-butoxide, tert-amyloxide, n-heptaoxide, menthoxide, benzyloxide and phenoxide; potassium or sodium salts of organic sulfonic acids, such as dodecylbenzensulfonic acid, tetradecylbenzenesulfonic acid, hexadecylbenzenesulfonic acid, octadecylbenzenesulfonic acid and the like.

The polar modifier will typically be employed at a level wherein the molar ratio of the polar modifier to the lithium initiator is within the range of about 0.01:1 to about 5:1. The potassium or sodium compound is preferably added in an amount of 0.005 to 0.5 mol per mol equivalent of the alkali metal of the polymerization initiator. When the amount is less than 0.005 mol equivalent, the addition effect of the potassium compound (the increase in the reactivity of polymerization initiator and the randomization or single chain addition of aromatic vinyl compound) may not appear. Meanwhile, when the amount is more than 0.5 mol equivalent, there may be a reduction in polymerization activity and a striking reduction in productivity and, moreover, there may be a reduction in the modification efficiency in the primary modification reaction.

Also, the elastomeric copolymer preferably comprises units having a star structure and being produced by the reaction of metal-terminated living linear copolymer with one or more coupling agents. The coupling agent is preferably a tin halide coupling agent, preferably the tin halide coupling agent is tin tetrachloride. Alternatively, the coupling agent is a silicon halide coupling agent, more preferably the silicon halide coupling agent is selected from silicon tetrachloride, silicon tetrabromide, silicon tetrafluoride, silicon tetraiodide, hexachlorodisilane, hexabromodisilane, hexafluorodisilane, hexaiodosilane, octachlorotrisilane, octabromotrisilane, octafluorotrisilane, octaiodotrisilane, hexachloro-disiloxane, 2,2,4,4,6,6-hexachloro-2,4,6-trisilaheptane-1,2,3,4,5,6-hexakis[2-(methyldichlorosilyl)ethyl]-benzene, and alkyl silicon halides of general Formula (IV), $R^6{}_n$—Si—$X_{4-n}$ (IV), wherein $R^6$ is a monovalent aliphatic hydrocarbon group having 1 to 20 carbon atoms or a monovalent aromatic hydrocarbon group having 6 to 18 carbon atoms; n is an integer of 0 to 2; and X can be a chlorine, bromine, fluorine or iodine atom.

The polymerization is normally carried out until high conversions of at least about 90% are attained. The polymerization is then typically terminated by the addition of a coupling agent. For example, a tin halide and/or silicon halide can be used as a coupling agent. The tin halide and/or the silicon halide are continuously added in cases where asymmetrical coupling is desired. The coupling agents can, in a hydrocarbon solution, be added to the polymerization admixture with suitable mixing for distribution and reaction.

It should be noted that, according to the present invention, the fraction of (co)polymer chains being coupled can typically vary between 15 to 75%, which is achieved by controlled addition of coupling agent, in the amount required to bond the desired portion of the (co)polymer chains. The exact amount of coupling agent is calculated based on its theoretical functionality and required coupling fraction. Functionality of coupling compound should be understood as the theoretical number of living chain ends which may undergo a reaction with coupling agent.

After addition of coupling agent, antioxidants, and/or alcohols for stopping polymerization reaction, may be added if necessary.

As per the seventh aspect, the method for preparing a rubber comprises vulcanizing the elastomeric copolymer according to the sixth aspect in the presence of one or more vulcanizing agents.

According to the eighth aspect, the invention relates to a rubber as obtainable according to the method of the seventh aspect.

As per the ninth aspect, a rubber composition comprises x) a rubber component comprising the rubber according to the eighth aspect. The rubber composition preferably further comprises y) one or more fillers. The filler is preferably selected from the group consisting of silica and carbon black, and it is most preferred that the rubber composition comprises y) both silica and carbon black.

In the rubber composition, the amount of filler component y) is preferably 10 to 150 parts by mass relative to 100 parts by mass of the rubber component x) (phr), more preferably, the amount of component y) is 20 to 140 phr. It is most preferred that the amount of component y) is 30 to 130 phr.

The rubber component x) in the rubber composition preferably also comprises one or more further rubbery polymers, and the further rubbery polymer is advantageously selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

The tire component of the tenth aspect of the invention comprises the rubber composition of the ninth aspect. Preferably, the tire component is a tire tread.

The tire as per the eleventh aspect comprises the tire component of the tenth aspect.

The present invention is described specifically below by way of examples. However, the present invention is in no way restricted to these examples.

EXAMPLES

In order to provide more details about the synthesis and properties of elastomers prepared according to the present invention, functionalized styrene-butadiene copolymers with exactly controlled micro- and macrostructure and with functional groups of various types are described, and are compared with a non-functionalized copolymer. "Parts per hundred rubber", "phr", and "%" are based on mass unless otherwise specified. The measurement methods and evaluation methods of properties are shown below.

Example 1a

A reactor of 1 L capacity, equipped with a magnetic stirrer, a dropping funnel and a reflux condenser equipped with a gas introduction attachment and an oil valve (Zaitsev washer), was loaded in argon atmosphere with magnesium metal (13.2 g, 0.55 mol), followed by the addition of dry and deoxygenated tetrahydrofuran (THF, 200 mL) and diisobutylaluminium hydride (DIBAH) [(i-Bu)$_2$AlH, 1 ml, 5.61 mmol]. This was done at room temperature, with stirring of the reactor contents. The activation of magnesium was conducted until evolution of hydrogen bubbles ceased. Then (N,N-dimethylamino)dimethylchlorosilane (68.85 g, 0.50 mol) and the remaining part (300 mL) of the solvent were added to the activated magnesium metal. The dropping funnel was filled with vinylbenzyl chloride (mixture of ca. 50/50 by weight m- and p-isomers (80.90 g, 0.53 mol). At the initiation step of the reaction, 8.00 mL of vinylbenzyl chloride were added dropwise into the mixture without stirring the reactor contents. When clear symptoms of the reaction proceeding were observed, dosing of the remaining amount of halogenated vinylbenzene derivative began with such a rate that the reactor content boiled gently for about 2 hours. After the dosing of vinylbenzyl chloride was completed, the reactor temperature was maintained in the range of 40° C. for one hour, followed by cooling to room temperature. To neutralize a small excess of (vinylbenzyl) magnesium chloride, 0.6 mL of water were added. Then, the solvent was evaporated from the post-reaction mixture under reduced pressure and 1.0 L of n-hexane were added to the reaction residue. The obtained suspension was filtered off and the precipitate was washed with three portions of n-hexane of 200 mL each. Then, the solvent was evaporated from the obtained filtrate under reduced pressure at 40° C. until a constant pressure was achieved. 101.40 g of dimethyl (vinyl-benzyl)silyldimethylamine (mixture of m- and p-isomers) were obtained, with a yield of 93%.

Example 2a (Comparative)

Acting in the same manner as in Example 1, (N,N-dimethylamino)dimethylchlorosilane (31.67 g, 0.23 mol) was reacted with 1-(chloromethyl)-4-vinylbenzene (36.62 g, 0.24 mol) in the presence of 6.19 g (0.26 mol) of Mg (activated with DIBAH, 0.5 ml, 2.80 mmol). 50.47 g of dimethyl(4-vinylbenzyl)silyldimethylamine were obtained, with a yield of 93%.

Example 3a

Acting in the same manner as in Example 1, (N,N-dimethylamino)dimethylchlorosilane (31.67 g, 0.23 mol) was reacted with vinylbenzyl chloride (mixture of ca. 20/80 by weight o- and p-isomers, 36.62 g, 0.24 mol) in the presence of 6.19 g (0.26 mol) of Mg (activated with DIBAH, 0.5 ml, 2.80 mmol). 50.47 g of dimethyl(vinylbenzyl)silyldimethylamine (mixture of o- and p-isomers) were obtained, with a yield of 93%.

Synthetic Examples for Functionalized Rubbers
Polymerization
Inertization Step:

Cyclohexane (1.2 kg) was added to a nitrogen-purged two-liter reactor and treated with 1 gram of 1.6 M n-butyl lithium solution in cyclohexane. The solution was heated to 70° C. and vigorously stirred for 10 minutes, to perform cleaning and inertization of the reactor. After that, solvent was removed via a drain valve and nitrogen was purged again.

Example 1b (comparative)

Cyclohexane (820 g) was added to the inerted two-liter reactor, followed by addition of styrene (31 g) and of 1,3-butadiene (117 g). Inhibitor from styrene and 1,3 butadiene was removed. Next, tetramethyl-ethylenediamine (TMEDA, 2.21 mmol) was added, to provide random incorporation of styrene monomer and to increase the vinyl content of the butadiene-derived units. The solution inside the reactor was heated to 60° C. and continuously stirred during the whole process. When the desired temperature was reached, n-butyl lithium (0.045 mmol) was added, to perform quenching of residual impurities. Then, n-butyl lithium (0.845 mmol) was added to initiate the polymerization process. The reaction was carried out as a isothermic process for 60 minutes. After this time, silicon tetrachloride (5.25× 10$^{-5}$ mol) was added to the polymer solution as a coupling agent. Coupling was performed for 5 minutes. The reaction solution was terminated, using nitrogen-purged isopropyl alcohol (1 mmol), and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example 2b (Styrene Derivative from Example 1a as Comonomer)

Cyclohexane (820 g) was added to the inerted two-liter reactor, followed by addition of styrene (31 g), dimethyl (vinylbenzyl)silyldimethylamine (50/50 by weight mixture of para- and meta-isomers, 0.4 g) and 1,3-butadiene (117 g). Inhibitor from styrene and 1,3-butadiene was removed. Next, 2,2-Bis(2-tetrahydrofuryl)propane (DTHFP, 2.52 mmol) was added, to provide random incorporation of styrene monomer and to increase the vinyl content of the butadiene-derived units. The solution inside the reactor was heated to 60° C. and continuously stirred during the whole process. When the desired temperature was reached, n-butyl lithium (0.045 mmol) was added, to perform quenching of residual impurities. Then, n-butyl lithium (0.84 mmol) was added to initiate the polymerization process. The reaction was carried out as a isothermic process for 60 minutes. After this time, silicon tetrachloride (6.30×10$^{-5}$ mol) was added to the polymer solution as a coupling agent. Coupling was performed for 5 minutes. The reaction solution was terminated, using nitrogen-purged isopropyl alcohol (1 mmol), and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example 3b (Styrene Derivative from Example 1a as Both Initiator Component and as Comonomer)

Cyclohexane (820 g) was added to the inerted two-liter reactor, followed by addition of styrene (31 g), dimethyl (vinylbenzyl)silyldimethylamine (50/50 by weight mixture of para- and meta-isomers, 0.4 g) and 1,3-butadiene (117 g). Inhibitor from styrene and 1,3-butadiene was removed.

Next, 2,2-Bis(2-tetrahydrofuryl)propane (DTHFP, 3.69 mmol) was added as a styrene randomizer and to increase the vinyl content of the butadiene monomer-contributed units. The solution inside the reactor was heated to 60° C. and continuously stirred during the whole process. When the temperature was reached, n-butyl lithium (0.045 mmol) was added to the reactor, to perform quenching of residual impurities.

n-BuLi (1.23 mmol) and dimethyl(vinylbenzyl)silyldimethylamine (50/50 by weight mixture of para- and meta-isomers, 0.26 g) were mixed together in a burette, the contact time was about 15 min, and then the mixture was added to initiate the polymerization process. The reaction was carried out over 60 minutes, as an isothermic process. After this time, silicon tetrachloride ($6.30\times10^{-5}$ mol) was added to the polymer solution as a coupling agent. Coupling was performed for 5 minutes. The reaction solution was terminated, using nitrogen-purged isopropyl alcohol (1 mmol), and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example 4b (Continuous Polymerization)

A butadiene-styrene copolymer was prepared in a continuous reactor chain of three reactors having a volume of 10 L (reactor 1), 20 L (reactor 20) and 10 L (reactor 3), respectively, where each reactor was equipped with a paddle stirrer. The agitation speed was 150-200 rpm and filling factor at the level of 50%-60%. Hexane, styrene, 1,3-butadiene, 1,2-butadiene (gel formation prevention additive), DTHFP and dimethyl(vinylbenzyl)silyldimethylamine, 50/50 by weight mixture of para- and meta-isomers (the last three reactants as solutions in hexane) were dosed into the first reactor, with flow rates of 10752.00 g/h, 398.00 g/h, 1499.00 g/h, 19.00 g/h, 102 g/h and 31.40 g/h, respectively. n-Butyl lithium flow rate (n-BuLi, as a solution in hexane) was 107.00 g/h, and dimethyl(vinylbenzyl)silyldimethylamine (as a solution in hexane) flow rate was 105.00 g/h. Streams of n-BuLi and 50/50 by weight mixture of isomers of dimethyl(vinylbenzyl)silyldimethylamine (50/50 by weight mixture of para- and meta-isomers) were mixed together in the pipe, before entering the reactor, and the contact time was about 15 min. The temperature in the reactors was between 70° C. to 85° C. To obtain branched rubber silicon tetrachloride was added at the reactor 3 inlet, at the entry of static mixer, in a $SiCl_4$/active n-BuLi ratio of 0.05. The coupling reaction was performed at 70-85° C. At the reactor 3 outlet, 2-methyl-4,6-bis(octylsulfanylmethyl)phenol (as a solution in hexane) was added as an antioxidant (142 g/h). The polymers were recovered by a conventional recovery operation using steam stripping of the solvent, were dried in a screw-type dewatering system at 70° C., and then dried for 40 minutes in the dryer.

Characterization

Vinyl Content (%)
  Determined by 600 MHz $^1$H-NMR, based on BS ISO 21561:2005
Bound Styrene Content (%)
  Determined by 600 MHz $^1$H-NMR, based on BS ISO 21561:2005
Molecular Weight Determination
  Gel permeation chromatography was performed via PSS Polymer Standards Service multiple columns (with guard column) using THF as the eluent and for sample preparation. Multi-angle laser light scattering measurements were carried out using a Wyatt Technologies Dawn Heleos II light scattering detector, DAD (PDA) Agilent 1260 Infinity UV-VIS detector and Agilent 1260 Infinity refractive index detector.
Glass Transition Temperature (° C.)
  Determined based on PN-EN ISO 11357-1:2009
Mooney Viscosity (ML (1+4)/100° C.)
  Determined based on ASTM D 1646-07, using a large rotor under the conditions of preheating=1 minute, rotor operating time=4 minutes, and temperature=100° C.
Vulcanization Characteristics
  Determined based on ASTM D6204, using RPA 2000 Alpha Technologies rubber processing analyzer, operating time=30 minutes, and temperature=170° C.
Evaluation and Measurement of Properties of Rubber Composition A vulcanized rubber compound was prepared using a polymer obtained in each of Examples, and was measured for the following test parameters
i) Tire Predictors (Tan δ at 60° C., Tan δ at 0° C., Tan δ at –10° C.)
  A vulcanized rubber compound was used as a test sample and measured for this parameter, using a dynamic mechanical analyzer (DMA 450+MetraviB) in single shear mode under the conditions of dynamic strain=2%, frequency=10 Hz, in the temperature range of from –70 to 70° C., with a heating rate of 2.5 K/min.
ii) Rebound Resilience
  Determined based on ISO 4662
Table 1 shows the characterization results for the four samples synthesized for this study.

TABLE 1

| Example | $M_n$ [g/mol] | $M_w$ [g/mol] | $M_w/M_n$ | Vinyl content [%][1] | Styrene content [%] | Mooney | Tg [° C.] |
|---|---|---|---|---|---|---|---|
| 1b (comp.) | 224,000 | 321,000 | 1.43 | 61.70 | 21.45 | 61.4 | –25.8 |
| 2b | 226,000 | 317,500 | 1.40 | 61.63 | 20.70 | 56.2 | –24.6 |
| 3b | 224,000 | 320,900 | 1.43 | 62.50 | 21.52 | 61.3 | –24.9 |
| 4b | 187,000 | 327,900 | 1.75 | 62.43 | 21.68 | 53.2 | –23.7 |

[1]Based on 1,3-butadiene content

Compounding

Using the rubbers obtained in Examples 2b, 3b, 4b and Comparative Example 1b, respectively, compounding was made according to the "compounding recipe of rubber composition" shown in Table 2. The compounding of the solution styrene-butadiene rubber, fillers, and rubber additives was performed in a Banbury type of internal mixer (350E Brabender GmbH& Co. KG) and on a lab-sized two roll mill. The rubber compounds were mixed in two different stages and the final pass was completed on a two roll mill. The first stage was used to mix the polymer with oil, silica, silane coupling agent, 6PPD and activators in several steps. The second stage was to further improve the distribution of the silica along with adding of carbon black, then the compound was allowed to sit for 24 hours. In order to be conditioned for the final pass, the rubber compound was allowed to condition for four hours. The final mixing was performed on a two roll mill. The last step was used to add the cure packages. Then, each compound was vulcanized at 170° C., for $T_{95+1.5}$ minutes (based on RPA results), to obtain vulcanizates. Each vulcanized rubber compound was evaluated and measured for the above-mentioned curing characteristics, tire predictors and rebound resilience. The results are shown in Table 3.

TABLE 2

| Component | phr |
| --- | --- |
| SBR | 75 |
| Polybutadiene rubber[1] | 25 |
| Silica[2] | 80 |
| Carbon Black[3] | 10 |
| Stearic acid | 2 |
| Zinc oxide | 3 |
| Oil extender[4] | 37.5 |
| 6PPD[5] | 2 |
| Bis[3-(triethoxysilyl)propyl]tetrasulfide[6] | 6.4 |
| N-tert-butyl-2-benzothiazole sulfenamide[7] | 1.7 |
| 1,3-Diphenylguanidine[8] | 2 |
| Sulphur | 1.5 |

[1]Synteca 44, a product of Synthos,
[2]Zeosil 1165MP, a product of Solvay,
[3]ISAF-N234, a product of Cabot corporation,
[4]VivaTec 500, a product of Klaus Dahleke KG,
[5]VULKANOX 4020/LG, a product of Lanxess,
[6]Si 69, a product of Evonik,
[7]LUVOMAXX TBBS, a product of Lehmann & Voss & Co. KG,
[8]DENAX, a product of Draslovka a.s.

TABLE 3

| Example | Rebound resilience (23° C.), [%] | Rebound resilience (70° C.), [%] | tan δ (60° C.) | tan δ, (0° C.) | tan δ, (−10° C.) |
| --- | --- | --- | --- | --- | --- |
| 1c (comp.) | 32.0 | 55.0 | 0.186 | 0.5142 | 0.6640 |
| 2c | 35.0 | 61.0 | 0.146 | 0.6467 | 0.7556 |
| 3c | 38.0 | 66.0 | 0.132 | 0.6439 | 0.7886 |
| 4c | 39.0 | 67.0 | 0.141 | 0.6790 | 0.9468 |

It is apparent from these results that in a silica mix, as judged based on the properties in the vulcanized state, SSBR 3b according to the invention imparts to the corresponding rubber composition 3c reinforcement properties which are superior to those obtained with the control SSBR 1 b and with the other SSBR 2b according to the invention. Moreover, the data in Table 3 shows that SSBR 4b obtained in continuous polymerization has better reinforcement properties compared to control SSBR 1 b and SSBR 2b.

Furthermore, the tire predictors of rubber composition 3c according to the invention are improved relative to those of the control rubber composition 1c and of the rubber compositions 2c and 4c (in terms of rolling resistance) according to the invention. Moreover, said tire predictors are improved for rubber composition 2c according to the invention relative to the control rubber composition 1c. Furthermore, tire predictors are improved for rubber composition 4c according to the invention relative to the control rubber composition 1c; additionally, ice traction and dry traction properties are improved relative to those of rubber compositions 1c, 2c, and 3c.

The invention claimed is:

1. An initiator component comprising an alkali metal salt derivative of a mixture of two or more styrene derivatives of Formula (I),

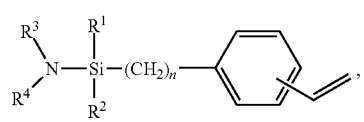

(I)

wherein n is 0 or 1;

$R^1$ and $R^2$ are the same or different and represent an alkyl group containing from 1 to 10 carbon atoms, or an aryl or aralkyl group containing from 6 to 10 carbon atoms; and i) $R^3$ and $R^4$ are the same or different and each $R^3$ and $R^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or ii) $R^3$ and $R^4$ are bonded to each other to form a heterocyclic ring containing the nitrogen atom and at least one carbon atom and, optionally, at least one heteroatom selected from a silicon atom, an oxygen atom and a nitrogen atom; and the mixture of the two or more styrene derivatives of Formula (I) comprises (1) para isomer, and (2) meta or ortho isomer of one type of the styrene derivative of Formula (I), wherein in the mixture of the two or more styrene derivatives of Formula (I), the weight ratio of the para isomer to the meta or ortho isomer ranges from 1:9 to 9:1.

2. The initiator component of claim 1, wherein $R^1$ and $R^2$ both represent $CH_3$.

3. The initiator component of claim 1, wherein i) $R^3$ and $R^4$ in the Formula (I) are independently selected from methyl and methoxyethyl groups, or ii) $R^3$ and $R^4$ in the Formula (I) are bonded to each other to form a 1,4-butylene or 1,5-pentylene group.

4. The initiator component of claim 3, wherein the two or more styrene derivatives of Formula (I) are selected from Formula (1), (2), (3), (4), (5), or (6)

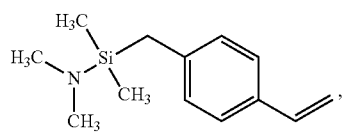

(1)

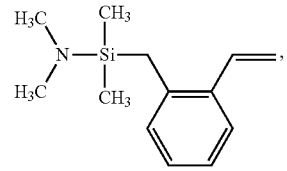

(2)

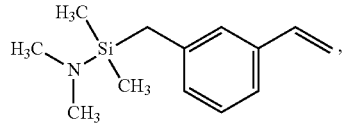

(3)

-continued

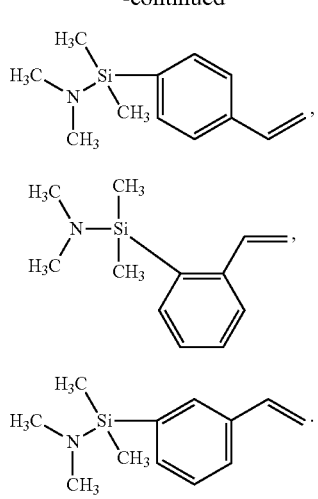

5. The initiator component of claim 3, wherein the two or more styrene derivatives of Formula (I) are selected from Formula (7), (8), (9), or (10)

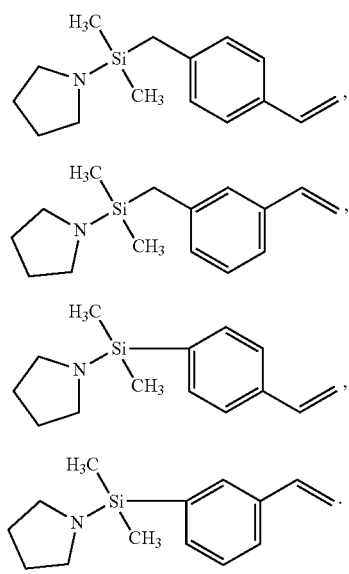

6. A method of preparing a copolymer, comprising copolymerizing (i) the mixture of the two or more styrene derivatives of Formula (I) according to claim 1, (ii) one or more diene monomers, and optionally (iii) one or more vinyl aromatic monomers, other than the two or more styrene derivatives of Formula (I) in (i), wherein (a) the mixture of the two or more styrene derivatives of Formula (I) is used as a comonomer; and (b) the alkali metal salt derivative of the mixture of the two or more styrene derivatives of Formula (I) is used as an initiator for the copolymerization;

wherein the copolymer comprises repeat units that are derived from

A) 20 wt. % to 99.95 wt. %, by weight of the copolymer, of the one or more diene monomers;

B) 0 wt. % to 60 wt. %, by weight of the copolymer, of the one or more vinyl aromatic monomers; and C) 0.05 wt. % to 50 wt. %, by weight of the copolymer, of the mixture of the two or more styrene derivatives of Formula (I).

7. The method of claim 6, comprising copolymerizing (i) the mixture of the two or more styrene derivatives of Formula (I), (ii) one or more conjugated diene monomers and optionally (iii) one or more vinyl aromatic monomers, wherein the alkali metal salt derivative of the mixture of the two or more styrene derivatives of Formula (I) is used as an initiator for the copolymerization, wherein the alkali metal is selected from lithium, sodium, and potassium.

8. The initiator component of claim 1, wherein in the mixture of the two or more styrene derivatives of Formula (I), the para isomer constitutes at least 30% by weight.

9. The initiator component of claim 1, wherein in the mixture of the two or more styrene derivatives of Formula (I), the para isomer constitutes 40% to 80% by weight and wherein the mixture of the two or more styrene derivatives of Formula (I) comprises the para isomer and meta isomer of one type of the styrene derivatives of Formula (I).

10. A method for the preparation of an initiator component comprising an alkali metal salt derivative of a mixture of two or more styrene derivatives of Formula (I),

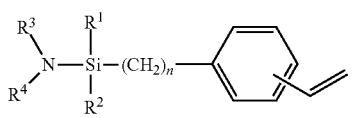

wherein
n is 0 or 1;
R$^1$ and R$^2$ are the same or different and represent an alkyl group containing from 1 to 10 carbon atoms, or an aryl or aralkyl group containing from 6 to 10 carbon atoms; and
i) R$^3$ and R$^4$ are the same or different and each R$^3$ and R$^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or
ii) R$^3$ and R$^4$ are bonded to each other to form a heterocyclic ring containing the nitrogen atom and at least one carbon atom and, optionally, at least one heteroatom selected from a silicon atom, an oxygen atom and a nitrogen atom; and the mixture of the two or more styrene derivatives of Formula (I) comprises (1) para isomer and (2) meta or ortho isomer of one type of the styrene derivative of Formula (I), wherein in the mixture of the two or more styrene derivatives of Formula (I), the weight ratio of the para isomer to the meta or ortho isomer ranges from 1:9 to 9:1, the method comprising
(a) reacting a halogenosilane of Formula (II)

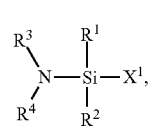

wherein $X^1$ is selected from chlorine, bromine, and iodine atoms, and $R^1$, $R^2$, $R^3$ and $R^4$ are as defined above, with a mixture of two or more magnesium compounds of Formula (III),

wherein $X^2$ is selected from chlorine, bromine, and iodine atoms to obtain the mixture of two or more styrene derivatives of Formula (I); and (b) converting the mixture of two or more styrene derivatives of Formula (I) into the alkali metal salt derivative.

11. A process for the preparation of a copolymer component comprising coupled copolymer and terminally modified copolymer, the process comprising the following steps:

(1) providing an initiator component comprising an alkali metal salt derivative of a mixture of two or more styrene derivatives of Formula (I),

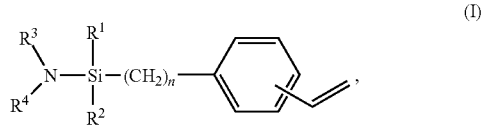

wherein
n is 0 or 1;
$R^1$ and $R^2$ are the same or different and represent an alkyl group containing from 1 to 10 carbon atoms, or an aryl or aralkyl group containing from 6 to 10 carbon atoms; and
i) $R^3$ and $R^4$ are the same or different and each $R^3$ and $R^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or
ii) $R^3$ and $R^4$ are bonded to each other to form a heterocyclic ring containing the nitrogen atom and at least one carbon atom and, optionally, at least one heteroatom selected from a silicon atom, an oxygen atom and a nitrogen atom; and
the two or more styrene derivatives of Formula (I) comprise (x) para isomer and (y) meta or ortho isomer of one type of the styrene derivative of Formula (I), wherein in the mixture of the two or more styrene derivatives of Formula (I), the weight ratio of the para isomer to the meta or ortho isomer ranges from 1:9 to 9:1;

(2) contacting a monomer component comprising
i) one or more conjugated diene monomers and
ii) optionally one or more vinyl aromatic monomers with the initiator component, to initiate anionic copolymerization;

(3) continuing copolymerization, to result in a copolymer;
(4) optionally continuing copolymerization of the copolymer, in the presence of one or more functionalized monomers, to result in a functionalized copolymer;
(5) coupling a part of the copolymer of step (3) or the functionalized copolymer of step (4) with one or more coupling agents, to result in coupled copolymer; and
(6) terminally modifying a part of the copolymer of step (3) or the functionalized copolymer of step (4) with one or more terminal modifying agents, to result in terminally modified copolymer, wherein the monomer component in step (2) comprises the two or more styrene derivatives of Formula (I).

12. The process of claim 11, wherein $R^1$ and $R^2$ in the Formula (I) both represent $CH_3$.

13. The process of claim 11, wherein i) $R^3$ and $R^4$ in the Formula (I) are independently selected from methyl and methoxyethyl groups, or ii) $R^3$ and $R^4$ in the Formula (I) are bonded to each other to form a 1,4-butylene or 1,5-pentylene group.

14. The process of claim 11, wherein the two or more styrene derivatives of Formula (I) are selected from Formula (1), (2), (3), (4), (5), or (6)

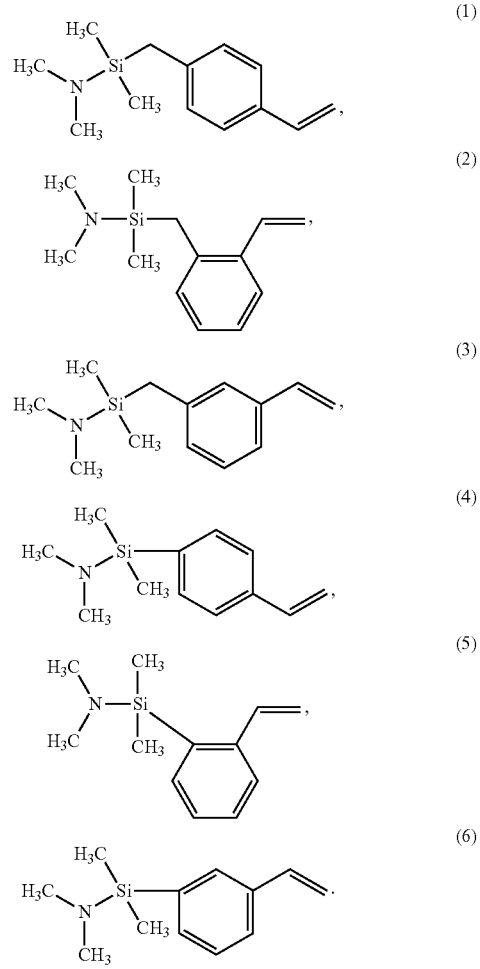

15. The process of claim 11, wherein the two or more styrene derivatives of Formula (I) are selected from Formula (7), (8), (9), or (10)

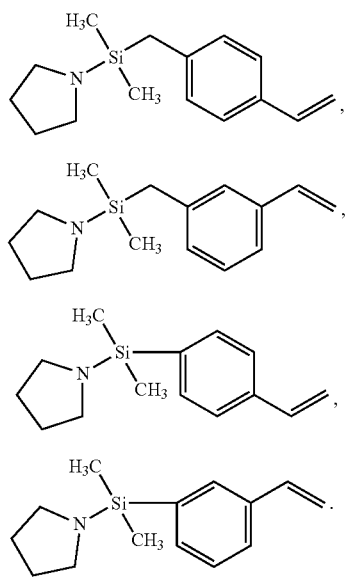

(7), (8), (9), (10)

16. The copolymer component produced by the process of claim 11.

17. A process for producing an elastomeric copolymer comprising subjecting
one or more diene monomers,
optionally one or more vinyl aromatic monomers and
a mixture of two or more styrene derivatives of Formula (I)

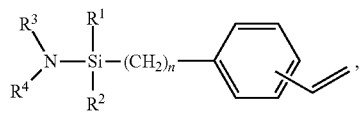
(I)

wherein
n is 0 or 1;
$R^1$ and $R^2$ are the same or different and represent an alkyl group containing from 1 to 10 carbon atoms, or an aryl or aralkyl group containing from 6 to 10 carbon atoms; and
i) $R^3$ and $R^4$ are the same or different and each $R^3$ and $R^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or
ii) $R^3$ and $R^4$ are bonded to each other to form a heterocyclic ring containing the nitrogen atom and at least one carbon atom and, optionally, at least one heteroatom selected from a silicon atom, an oxygen atom and a nitrogen atom; and
the mixture of the two or more styrene derivatives of Formula (I) comprises (1) para isomer and (2) meta or ortho isomer of one type of the styrene derivative of Formula (I), wherein in the mixture of the two or more styrene derivatives of Formula (I), the weight ratio of the para isomer to the meta or ortho isomer ranges from 1:9 to 9:1, to anionic polymerization conditions,
wherein an alkali metal salt derivative of the mixture of the two or more styrene derivatives of Formula (I) is used as an initiator for the anionic polymerization.

18. An elastomeric copolymer comprising repeat units that are derived from
A) 20 wt. % to 99.95 wt. %, by weight of the copolymer, of one or more diene monomers;
B) 0 wt. % to 60 wt. %, by weight of the copolymer, of one or more vinyl aromatic monomers; and
C) 0.05 wt. % to 50 wt. %, by weight of the copolymer, of two or more styrene derivatives of Formula (I)

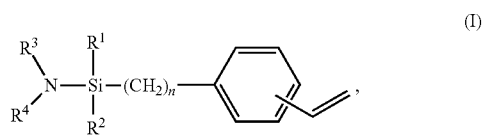
(I)

wherein
n is 0 or 1;
$R^1$ and $R^2$ are the same or different and represent an alkyl group containing from 1 to 10 carbon atoms, or an aryl or aralkyl group containing from 6 to 10 carbon atoms; and
i) $R^3$ and $R^4$ are the same or different and each $R^3$ and $R^4$ independently represents i) a hydrocarbyl group containing from 1 to 10 carbon atoms, the hydrocarbyl group optionally being interrupted by at least one heteroatom selected from a silicon atom, an oxygen atom or a nitrogen atom; or ii) an aryl or aralkyl group containing from 6 to 10 carbon atoms and optionally at least one heteroatom selected from a silicon atom, an oxygen atom or a nitrogen atom; or
ii) $R^3$ and $R^4$ are bonded to each other to form a heterocyclic ring containing the nitrogen atom and at least one carbon atom and, optionally, at least one heteroatom selected from a silicon atom, an oxygen atom and a nitrogen atom, and
the one or more vinyl aromatic monomers in B), when present, is different from the two or more styrene derivatives of Formula (I) in C), and
the two or more styrene derivatives of Formula (I) comprise (1) para isomer and (2) meta or ortho isomer of one type of the styrene derivative of Formula (I), wherein in the mixture of the two or more styrene derivatives of Formula (I), the weight ratio of the para isomer to the meta or ortho isomer ranges from 1:9 to 9:1,
wherein the elastomeric copolymer is prepared using an alkali metal salt derivative of the two or more styrene derivatives of Formula (I) as an initiator.

19. The elastomeric copolymer of claim 18, wherein the diene monomer is a conjugated diene monomer, wherein the conjugated diene monomer is selected from 1,3-butadiene and isoprene.

20. The elastomeric copolymer of claim 18, wherein the amount of A) conjugated diene monomer is 50 to 90 wt. %, by weight of the copolymer.

21. The elastomeric copolymer of claim 18, wherein the vinyl aromatic monomer is selected from styrene, 3-methylstyrene and α-methylstyrene.

22. The elastomeric copolymer of claim 18, wherein the amount of B) vinyl aromatic monomer is 10 to 50 wt. %, by weight of the copolymer.

23. The elastomeric copolymer of claim 18, wherein the amount of C) styrene derivative of Formula (I) is 0.2 to 10 wt. %, by weight of the copolymer.

24. The elastomeric copolymer of claim 18, wherein the copolymer comprises repeat units having a star structure and being produced by the reaction of metal-terminated living linear copolymer with one or more coupling agents.

25. The elastomeric copolymer of claim 24, wherein
I) the coupling agent is tin tetrachloride,
or
II) the coupling agent is a silicon halide coupling agent.

26. The elastomeric copolymer of claim 24, wherein the fraction of repeat units having star structure is between 15 and 75%, by weight of the copolymer.

27. A method for preparing a rubber comprising vulcanizing the elastomeric copolymer according to claim 18 in the presence of one or more vulcanizing agents.

28. A rubber as obtainable according to the method of claim 27.

29. A rubber composition comprising x) a rubber component comprising the rubber according to claim 28 and y) one or more fillers.

30. The rubber composition according to claim 29, wherein the one or more fillers are each selected from the group consisting of silica and carbon black.

31. The rubber composition according to claim 30, wherein the amount of filler component y) is 20 to 140 parts by mass relative to 100 parts by mass of the rubber component x) (phr).

32. The rubber composition according to claim 29, wherein the rubber component x) also comprises one or more further rubbery polymers,
wherein the further rubbery polymer is selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

33. A tire component comprising the rubber composition of claim 32, wherein the tire component is a tire tread.

34. A tire comprising the tire component of claim 33.

* * * * *